US008257825B2

(12) United States Patent
Kim et al.

(10) Patent No.: US 8,257,825 B2
(45) Date of Patent: Sep. 4, 2012

(54) POLYMER ELECTRODE MEMBRANE FOR FUEL, AND MEMBRANE-ELECTRODE ASSEMBLY AND FUEL CELL SYSTEM COMPRISING THE SAME

(75) Inventors: Hee-Tak Kim, Suwon-si (KR); Ho-Jin Kweon, Suwon-si (JP)

(73) Assignee: Samsung SDI Co., Ltd., Yongin-si (KR)

( * ) Notice: Subject to any disclaimer, the term of this patent is extended or adjusted under 35 U.S.C. 154(b) by 1076 days.

(21) Appl. No.: 11/330,737

(22) Filed: Jan. 11, 2006

(65) Prior Publication Data

US 2006/0154128 A1 Jul. 13, 2006

(30) Foreign Application Priority Data

Jan. 12, 2005 (KR) .................. 10-2005-0002864

(51) Int. Cl.
- B32B 3/26 (2006.01)
- D21H 13/38 (2006.01)
- H01M 8/10 (2006.01)

(52) U.S. Cl. .......... 428/305.5; 428/311.51; 428/306.6; 428/307.3; 428/307.7; 429/492; 429/532

(58) Field of Classification Search ........... 428/305.5, 428/306.6, 307.3, 307.7, 311.51; 429/30, 429/33, 492, 532
See application file for complete search history.

(56) References Cited

U.S. PATENT DOCUMENTS

| | | | | |
|---|---|---|---|---|
| 5,102,745 A | * | 4/1992 | Tatarchuk et al. | 428/605 |
| 5,523,181 A | * | 6/1996 | Stonehart et al. | 429/314 |
| 6,042,958 A | | 3/2000 | Denton et al. | |
| 7,169,509 B2 | * | 1/2007 | Nobuta et al. | 429/218.1 |
| 7,550,117 B2 | * | 6/2009 | Alward et al. | 422/177 |
| 2006/0068270 A1 | * | 3/2006 | Ino et al. | 429/44 |
| 2006/0078784 A1 | * | 4/2006 | Liu et al. | 429/42 |
| 2008/0138697 A1 | * | 6/2008 | Asada et al. | 429/44 |
| 2008/0318125 A1 | * | 12/2008 | Sakamoto et al. | 429/223 |

FOREIGN PATENT DOCUMENTS

| | | |
|---|---|---|
| JP | 10-312815 A | 11/1998 |
| JP | 2003-142122 A | 5/2003 |
| JP | 2004-047450 | 2/2004 |
| KR | 10-2004-0084743 | 10/2004 |
| WO | WO 2004059768 A1 * | 7/2004 |
| WO | WO 2005086265 A1 * | 9/2005 |

OTHER PUBLICATIONS

Patent Abstracts of Japan and English language machine translation of JP 2003-142122, 11 shts.

KIPO Office action dated Aug. 1, 2011 in the priority Korean application No. 10-2005-0002864, pp. 1-8.

KIPO Notice of Allowance dated Mar. 12, 2012, for Korean priority Patent application 10-2005-0002864, 6 pages.

Patent Abstracts of Japan, and English machine translation of Japanese Publication 2004-047450 listed above.

* cited by examiner

*Primary Examiner* — Hai Vo

(74) *Attorney, Agent, or Firm* — Christie, Parker & Hale, LLP

(57) ABSTRACT

The present invention provides a polymer electrolyte membrane for a fuel cell, including a porous membrane including ceramic fibers crisscrossed in a network and pores formed by the ceramic fibers coalesced at intersection points, and a proton conductive polymer inside the pores.

6 Claims, 2 Drawing Sheets

POLYMER ELECTRODE MEMBRANE FOR FUEL, AND MEMBRANE-ELECTRODE ASSEMBLY AND FUEL CELL SYSTEM COMPRISING THE SAME

CROSS-REFERENCE TO RELATED APPLICATION

This application claims priority to and the benefit of Korean Patent Application No. 10-2005-0002864, filed in the Korean Intellectual Property Office on Jan. 12, 2005, the entire content of which is incorporated herein by reference.

FIELD OF THE INVENTION

The present invention relates to a polymer electrolyte membrane, a membrane-electrode assembly, and a fuel cell system comprising the same. More particularly, the present invention relates to a polymer electrolyte membrane having good thermal stability and mechanical strength that is capable of imparting a long life-span to a fuel cell due to improved dimensional stability, and a membrane-electrode assembly and a fuel cell system comprising the same.

BACKGROUND OF THE INVENTION

A fuel cell is a power generation system for producing electrical energy through an electrochemical redox reaction of an oxidant and a fuel such as hydrogen or a hydrocarbon-based material such as methanol, ethanol, natural gas, or the like.

Representative exemplary fuel cells include a polymer electrolyte membrane fuel cell (PEMFC) and a direct oxidation fuel cell (DOFC).

The direct oxidation fuel cell includes a direct methanol fuel cell which uses methanol as a fuel.

The polymer electrolyte fuel cell is an environmentally friendly energy source for replacing a conventional energy source. It has advantages such as high power output density, high energy conversion efficiency, operability at room temperature, and the cabability of being down-sized and closely sealed. Therefore, it can be applicable to a wide array of fields such as non-polluting automobiles, residential electricity generation systems, and as portable power sources for mobile equipment, military equipment, and the like.

The fuel cell can be classified as a gas-type fuel cell or a liquid-type fuel cell depending on which kind of fuel is used.

The gas-type fuel cell, which generally uses hydrogen as a fuel, has the advantage of high energy density, but the disadvantage of having to carefully handle hydrogen gas, and also the requirement of accessory facilities, such as a fuel reforming processor, for reforming methane or methanol, natural gas, and the like in order to produce hydrogen as the fuel.

On the contrary, a liquid-type fuel cell, which uses a liquid fuel, has a lower energy density than that of the gas-type fuel cell, but it has the advantages of the ease of handling liquid-type fuel, a low operation temperature, and no need for additional fuel reforming processors. Therefore, it has been acknowledged as an appropriate system for a portable power source for small and common electrical equipment.

In the above fuel cell system, the stack that generates electricity substantially includes several to many unit cells stacked in multiple layers, and each unit cell is formed with a membrane-electrode assembly (MEA) and a separator (also referred to as a bipolar plate).

The membrane-electrode assembly has an anode (also referred to as a fuel electrode or an oxidation electrode) and a cathode (also referred to as an air electrode or a reduction electrode) arranged with an electrolyte membrane between them.

The polymer membrane-electrode assembly is composed of a solid polymer electrolyte membrane and an electrode layer including catalysts supported on carbon. The polymer electrolyte membrane for the electrolyte is commercially available as a perfluorosulfonic acid ionomer membrane such as NAFION™ (by DuPont), FLEMION™ (by Asahi Glass), ASIPLEX™ (by Asahi Chemical), and Dow XUS™ (by Dow Chemical). An electrode layer including catalysts supported on carbon is provided by binding the electrode substrates, such as porous carbon paper or carbon cloth, with carbon powder carrying pulverized catalyst particles such as platinum (Pt) or ruthenium (Ru), using a waterproof binder.

Conventional polymers used in electrolyte membranes for fuel cells have good proton conductivity, but they may have problems including a high cost and low strength. Therefore, there has been a need for a polymer electrolyte membrane having high ion conductivity, high strength, and low cost.

SUMMARY OF THE INVENTION

An exemplary embodiment of the present invention provides a polymer electrolyte membrane having good thermal stability, ionic conductivity, the capability of reducing its thickness due to improved mechanical strength, and that is capable of imparting a long life-span to a fuel cell due to improved dimensional stability. Another embodiment of the present invention provides a method of preparing the above polymer electrolyte membrane.

Yet another embodiment of the present invention provides a membrane-electrode assembly including the above polymer electrolyte membrane that is capable of improving performance of a fuel cell.

Still another embodiment of the present invention provides a fuel cell system including the above membrane-electrode assembly.

According to one embodiment of the present invention, a polymer membrane for a fuel cell including a porous membrane and a proton conductive polymer in pores of the porous membrane is provided. The porous membrane includes ceramic fibers crisscrossing each other in a network form and coalesced with each other at the intersections thereof to form pores.

According to another embodiment of the present invention, a method of preparing a polymer electrolyte membrane is provided. Ceramic fibers, coalescing agents, organic fibers, and pulp are dispersed in water followed by compression to form a wet sheet. The wet sheet is dried to prepare a film and heat-treated to form pores, thereby preparing a porous membrane. Then, a proton conductive polymer is added to the pores of the porous membrane.

According to yet another embodiment of the present invention, a membrane-electrode assembly includes an anode and a cathode facing each other, and a polymer electrolyte membrane interposed therebetween. The polymer electrolyte membrane includes a porous membrane and proton conductive polymers added to the pores of the porous membrane. The porous membrane includes ceramic fibers crisscrossing each other in a network form, and coalesced with each other at the intersections thereof to form pores.

According to still another embodiment of the present invention, a fuel cell system is provided which includes at least one electricity generating element for generating electricity through oxidation of fuel and reduction of oxidants, a fuel supplier for providing fuel to the electricity generating element, and an oxidant supplier for supplying oxidants to the electricity generating element. The electricity generating element includes the above membrane-electrode assembly and separators positioned at both sides of the membrane-electrode assembly.

DETAILED DESCRIPTION OF THE INVENTION

The present invention provides a polymer electrolyte membrane with high ion conductivity and strength at a low cost, a method of preparing it, and a membrane-electrode assembly and a fuel cell system including the polymer electrolyte membrane.

According to an embodiment of the present invention, polymer electrolyte membranes (e.g., proton conductive polymer membranes) include porous membranes including ceramic fibers crisscrossed in a network and coalesced with each other at the intersections thereof to form pores, and proton conductive polymers in the pores.

Here, the ceramic fibers are connected with one another in three dimensions to impart mechanical strength to the membrane, and the proton conductive polymers play a role in transporting ions.

In an embodiment of the invention, a porous membrane is prepared by using a composition including ceramic fibers, coalescing agents, organic fibers, pulp, and water in a general paper manufacturing method. The ceramic fibers can be coated with coalescing agents in advance and thus the coalescing agents would not need to be separately added.

The present invention prepares sheets using general paper manufacturing methods by dispersing ceramic fibers, coalescing agents, organic fibers, and pulp in water, followed by compression. Then, films including ceramic fibers, organic fibers, and coalescing agents are prepared by volatilizing solvents. In an embodiment of the invention, the temperature for volatilizing the solvents is in the range of 50 to 200° C. The films are heated at 800 to 1400° C. to generate intersection points by a reaction between the coalescing agents and the ceramic fibers through firing, as shown in FIG. 1.

Figure 1:
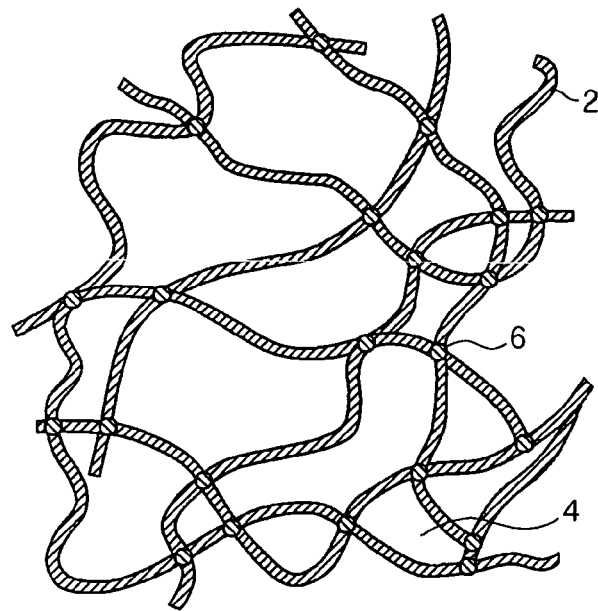
FIG. 1 is a schematic diagram showing an example of a structure of a porous membrane according to the present invention.

Referring to FIG. 1, reference numeral 2 indicates a ceramic fiber, reference numeral 4 a pore capable of being filled with a proton conductive polymer in the preparation of a polymer electrolyte membrane, and reference numeral 6 an intersection point. In addition, a porous membrane can be prepared as the organic fibers are removed by oxidation, leaving empty spaces, i.e., pores. The preferred thickness of the membrane is 20 to 100 μm.

According to an embodiment of the present invention, the porous membrane including ceramic fibers has a porosity of 50 to 90 volume %, and the size of a pore in the porous membrane is 0.01 to 3 μm. When the pore has a size smaller than 0.01 μm, ionomer domain size in the pore decreases and well connected ionic transfer pathways cannot be made. The ceramic fibers may have a thickness of 0.01 to 1 μm.

In an embodiment of the present invention, ceramic fibers are selected from the group consisting of silica, alumina, aluminosilicate, aluminoborosilicate, and mixtures thereof. The ceramic fibers comprise 3 to 30 wt % of the entire composition.

The coalescing agents play the role of connecting ceramic fibers by reacting therewith under heat treatment. The agents form borosilicate and aluminoborosilicate by reacting with the ceramic fibers at temperatures of 800 to 1400° C. In an embodiment of the present invention, the coalescing agents are selected from the group consisting of $B_2O_3$, BN, $B_4C$, $SiB_4$, $SiB_6$, and mixtures thereof. The amount is in the range of 2 to 15 wt % of the weight of the ceramic fibers. When the amount of the coalescing agents is less than 2 wt %, insufficient intersection points may be generated, resulting in bad connections among fibers, while when the amount of the coalescing agent is more than 15 wt %, too many intersection points may be generated, causing a loss of flexibility.

The amount of the organic fiber determines the porous form and size within the ceramic membrane. Accordingly, in an embodiment of the invention, the volume of the organic fibers is 0.3 to 3 times that of the ceramic fibers. When the volume of the organic fibers is less than 0.3 times that of the ceramic fibers, the volume of pores, which are intended to include ion-conductive polymers, also becomes smaller. On the contrary, when the volume of the organic fibers is over 3 times that of the ceramic fibers, the low amount of ceramic fiber can cause insufficient mechanical strength.

In another embodiment of the present invention, the organic fibers are selected from the group consisting of cellulose-based fibers such as cotton and the like, polyvinylalcohol-based fibers such as vinylon and the like, acryl polymers, polyester polymers, and mixtures thereof.

The present invention can provide polymer electrolyte membranes for fuel cells with excellent mechanical strength and improved cycle-life characteristics as well as thermal stability, by adding ion-conductive polymers to the porous membranes comprising the ceramic fibers.

The present invention employs general coating methods to fill the pores of the porous membranes with ion-conductive polymers.

In one embodiment, the coating process may include, but is not limited to, dip coating methods, screen printing methods, spray coating methods, or coating methods using doctor blades, depending on the viscosity of the coating dispersion.

In addition, polymer electrolyte membranes of the present invention are interposed between a cathode and an anode to form a membrane-electrode assembly.

The cathode and the anode include a diffusion layer and a catalyst layer.

The catalyst layer of the electrode includes metal catalysts which enable the oxidation of fuels and the reduction oxidants. In an embodiment of the present invention, suitable metal catalysts include those selected from the group consisting of platinum, ruthenium, osmium, platinum-ruthenium alloys, platinum-osmium alloys, platinum-palladium alloys, and platinum-M alloys, and mixtures thereof, where a suitable M is a transition metal selected from the group consisting of Ga, Ti, V, Cr, Mn, Fe, Co, Ni, Cu, and Zn and combinations thereof. In another embodiment M is selected from the group consisting of platinum, ruthenium, osmium, platinum-ruthenium alloys, platinum-osmium alloys, platinum-palladium alloys, platinum-cobalt alloys, or platinum-nickel alloys, and combinations thereof.

The metal catalysts used in the electrode may be supported on carriers, or not supported. When the metal catalysts are supported on carriers, the carriers may include carbon carriers or inorganic material carriers which are generally used in a fuel cell. The carbon carriers may include ketjen black, denka black, Vulcan X, acetylene black, graphite, or the like. The inorganic material carriers may include alumina, silica, titania, zirconia, or the like. However, the carriers are not necessarily limited to the above-described.

The diffusion layer supports the catalyst layer and enables reactants to diffuse into the catalyst layer. The diffusion layer may include carbon paper, carbon cloth, or a metal cloth, but is not limited thereto. It may be treated with fluorine-based polymers in order to provide water repellant properties so as to prevent deterioration of reactant diffusion efficiency by water generated during operation of the fuel cell. Fluorine-based polymers include polyvinylidenefluorides, polytetrafluoroethylenes, fluorinated ethylenepropylene, polychlorotrifluoroethylenes, fluoroethylene polymers, and so on.

The electrode may further include microporous layers in order to increase the reactant diffusion effects between the diffusion layer and the catalyst layers. The microporous layers play the role of uniformly supplying reactants to a catalyst layer and transporting electrons generated in the catalyst layer to porous polymer membranes. The microporous layer may be formed by coating with compositions including conductive powders, binders, and ionomers as needed. In general, the conductive powders have small diameter particles and can include carbon powder, carbon black, acetylene black, activated carbon, or a nano-carbon such as carbon nanotubes, carbon nanofiber, carbon nanowire, carbon nanohorns, carbon nanorings, and the like. Non-limiting examples of the binders can be polytetrafluoroethylene (PTFE), polyvinylidenefluoride, copolymers of polyvinylidenefluoride-hexafluoropropylene (PVDF-HFP), polyvinylalcohols, cellulose acetates, and so on. Non-limiting examples of the solvents can be alcohols such as ethanol, isopropylalcohol, ethanol, n-propylalcohol, butanol, water, dimethylacetamide (DMAc), dimethylformamide, dimethylsulfoxide (DMSO), N-methylpyrrolidone, tetrahydrofuran, and the like. The coating process may include, but is not limited to, screen printing, spray coating methods, coating methods using doctor blades, dip coating methods, silk screen methods, painting, and the like, depending on the viscosity of the coating dispersion.

In addition, the present invention can provide membrane-electrode assemblies by using the electrodes as either an anode or a cathode and interposing polymer electrolyte membranes between these two electrodes opposing each other, and then firing and hot-pressing them together.

The polymer electrolyte membranes include proton conductive polymers which are three-dimensionally formed inside the fine pores to form ion transport pathways.

The proton conductive polymers may be any polymer resin having a proton conductive functional group selected from the group consisting of sulfonic acid groups, carboxylic acid groups, phosphoric acid groups, phosphonic acid groups, and derivatives thereof at their side chains.

Non-limiting examples of the polymers include proton conductive polymers selected from the group consisting of perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, polyphenylquinoxaline-based polymers, and mixtures thereof. In one embodiment, the proton conductive polymers are selected from the group consisting of poly(perfluorosulfonic acid), poly(perfluorocarboxylic acid), copolymers of tetrafluoroethylene and fluorovinylether having a sulfonic acid group, defluorinated polyetherketone sulfides, aryl ketones, poly (2,2'-(m-phenylene)-5,5'-bibenzimidazole), or poly (2,5-benzimidazole), and mixtures thereof, but is not limited thereto.

Fuel cell systems of the present invention include electricity generating elements, fuel suppliers, and oxidant suppliers. The electricity generating elements include unit cells wherein the above membrane-electrode assemblies are positioned between separators having reactant flow channels and cooling channels.

The fuel cell systems generate electricity through the oxidation of fuels and reduction of oxidants. The fuels include hydrogen or hydrogen-containing hydrocarbons. The oxidants include air or pure oxygen. Fuel suppliers supply fuel to the electricity generating elements, and oxidant suppliers supply the oxidants to the electricity generating elements.

Figure 2:
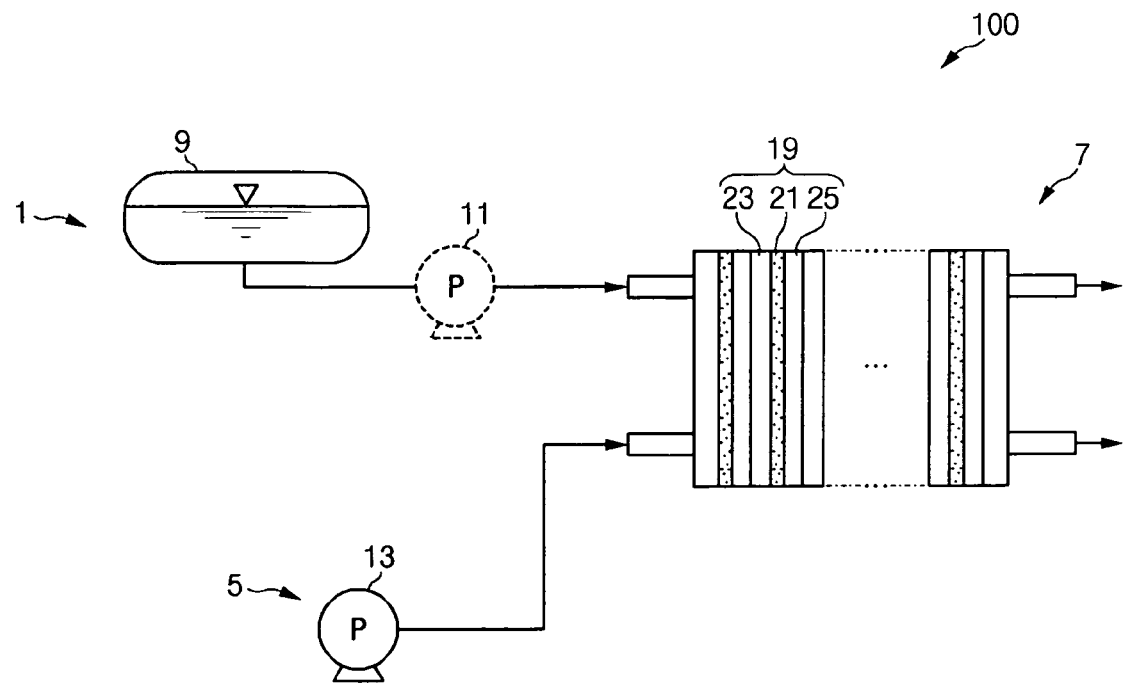
FIG. 2 is a schematic diagram showing a fuel cell system according to the present invention.

The schematic structure of fuel cell systems according to the present invention is illustrated in FIG. 2 and will be described below referring to the drawing. FIG. 2 illustrates a fuel cell system wherein a fuel and an oxidant are provided to the electricity generating element through pumps, but the present invention is not limited to such structures. The fuel cell system of the present invention alternately includes a structure wherein a fuel and an oxidant are provided in a diffusion manner.

The fuel cell system 100 includes a stack 7 which includes at least one electricity generating element 19 for generating electrical energy through oxidation of a fuel and reduction of an oxidant, a fuel supplier 1, and an oxidant supplier 5.

The fuel supplier 1 is equipped with a fuel storage tank 9, and a fuel pump 11 connected to the fuel tank 9.

The fuel pump 11 discharges a fuel stored in the fuel tank 9 to stack 7.

The oxidant supplier 5 for supplying oxidant to the electricity generating element 19 of the stack 7 is equipped with at least one pump 13.

The electricity generating element 19 includes a membrane-electrode assembly 21 which performs oxidation of the fuel and oxidant reduction, and separators 23 and 25 which are respectively positioned at opposite sides of the membrane-electrode assembly and provide the fuel and the oxidant to the membrane-electrode assembly 21.

In the fuel cell systems of the present invention, fuel is supplied to the anode and an oxidant is supplied to the cathode to generate electricity through an electrochemical reaction between the anode and cathode. At the anode, hydrogen or an organic fuel is oxidized, and at the cathode, the oxidant is reduced so that a voltage difference between the electrodes occurs.

The following examples illustrate the present invention in further detail. However, it is understood that the present invention is not limited by these examples.

EXAMPLE 1

2.1 g of an amorphous silica fiber, 0.5 g of an alumina fiber, 1.5 g of polyvinylalcohol as an organic fiber, 0.08 g of boron nitride, and 1.2 g of pulp were dispersed in deionized water, and then a paper-molding process was performed thereto. A wet paper prepared as above was dried at 100° C. to remove some moisture and it was heat-treated at 1300° C. for 30 minutes to remove pulp, such that ceramic fibers could be connected in a three-dimensional network to form a porous ceramic membrane.

This porous ceramic membrane was transformed into a polymer electrolyte membrane by dip-coating it in an ion-conductive polymer solution including poly (perfluorosulfonic acid) (NAFION™, DuPont), primarily dried at 60° C., and then slot-die coated with a polymer solution including NAFION on both sides thereof.

Then, the polymer electrolyte membrane was interposed between an anode and a cathode to form a stack. The stack was calcinated at 100° C. for one minute and thermally compressed to prepare a membrane-electrode assembly.

The prepared membrane-electrode assembly was interposed between two sheets of gaskets, and then the membrane-electrode assembly with gaskets at both sides was interposed between two separators having a reactant flow channel and a cooling channel, and then the whole assembly was compressed between copper end plates to fabricate a unit cell.

COMPARATIVE EXAMPLE 1

A unit cell was according to the same method as in Example 1, except that poly (perfluorosulfonic acid) (NAFION™, DuPont) was used instead of a porous membrane as an electrolyte membrane.

EXPERIMENTAL EXAMPLE

Fuel cells were fabricated by using unit cells prepared in Example 1 and Comparative Example 1.

Figure 3:
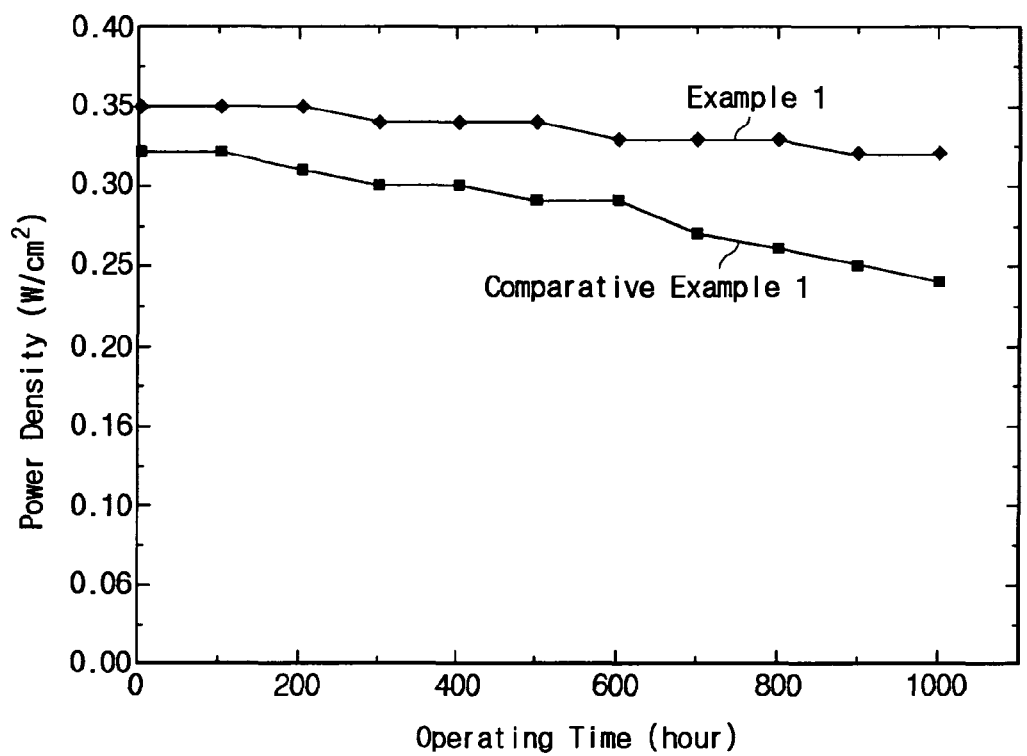
FIG. 3 is a graph showing measurement results of the output current of fuel cells according to Example 1 and Comparative Example, 1 at various operation times.

The fuel cells were supplied with 50%-humidified air and hydrogen at the cathode and anode and operated at 60° C. without back pressure. Then, its power output density was measured, maintaining the unit cell at 0.4V after injecting a fuel into the cathode in a stoichiometric amount of 2.0 and into the anode in a stoichiometric amount of 1.3 as a stoichiometric negative electrode. FIG. 3 shows power output currents according to the operation time of the fuel cells fabricated in Example 1 and Comparative Example 1. Referring to the results of FIG. 3, the fuel cell of Example 1 shows more stable cycle-life than that of Comparative Example 1, likely due to the increased mechanical strength from the inorganic material network.

The present invention can provide polymer electrolyte membranes having good thermal stability and mechanical strength by adding ion-conductive polymers to porous membranes, and such membranes are capable of imparting long cycle-life characteristics to fuel cells due to a decreased thickness of the membranes of under 30 μm and improved dimensional stability. Therefore, the present invention can provide fuel cells with excellent performance characteristics by using membrane-electrode assemblies prepared with polymer electrolyte membranes.

While this invention has been described in connection with what are presently considered to be exemplary embodiments, it is to be understood that the invention is not limited to the disclosed embodiments, but, on the contrary, is intended to cover various modifications and equivalent arrangements included within the spirit and scope of the appended claims.

What is claimed is:

1. A proton conductive polymer membrane for a fuel cell, comprising:
    a porous membrane comprising ceramic fibers crisscrossed in a network and pores formed by the ceramic fibers coalesced at the intersection points, and
    a proton conductive polymer in the pores,
    wherein the ceramic fibers comprise from 3 to 30 wt % of the proton conductive polymer membrane, wherein a size of the pores is from 0.01 to 3 μm, and wherein the proton conductive polymer membrane is adapted to conduct protons without conducting electrons.

2. The proton conductive polymer membrane of claim 1, wherein the ceramic fiber is selected from the group consisting of silica fiber, alumina fiber, aluminosilicate fiber, aluminoborosilicate fiber, and mixtures thereof.

3. The proton conductive polymer membrane of claim 1, wherein the ceramic fiber is coalesced at intersection points by a coalescing agent.

4. The proton conductive polymer membrane of claim 3, wherein the coalescing agent is a compound selected from the group consisting of $B_2O_3$, $BN$, $B_4C$, $SiB_4$, $SiB_6$, and mixtures thereof.

5. The proton conductive polymer membrane of claim 1, wherein the ceramic fiber is coated with a coalescing agent.

6. The proton conductive polymer membrane of claim 1, wherein the proton conductive polymer is selected from the group consisting of perfluoro-based polymers, benzimidazole-based polymers, polyether-based polymers, polyimide-based polymers, polyetherimide-based polymers, polyamide-based polymers, polyphenylenesulfide-based polymers, polysulfone-based polymers, polyethersulfone-based polymers, polyetherketone-based polymers, polyetheretherketone-based polymers, polyphenylquinoxaline-based polymers, and mixtures thereof.

* * * * *